US012792129B2

(12) United States Patent
Popovic

(10) Patent No.: US 12,792,129 B2
(45) Date of Patent: Nov. 10, 2026

(54) COMPUTING SYSTEM POWER SURGE MITIGATION

(71) Applicant: ATI Technologies ULC, Markham (CA)

(72) Inventor: Josip Popovic, Ottawa (CA)

(73) Assignee: ATI Technologies ULC, Markham (CA)

( * ) Notice: Subject to any disclaimer, the term of this patent is extended or adjusted under 35 U.S.C. 154(b) by 82 days.

(21) Appl. No.: 18/900,697

(22) Filed: Sep. 28, 2024

(65) Prior Publication Data

US 2026/0093312 A1 Apr. 2, 2026

(51) Int. Cl.
*G06F 1/329* (2019.01)

(52) U.S. Cl.
CPC .................................... *G06F 1/329* (2013.01)

(58) Field of Classification Search
CPC ......... G06F 9/30079; G06F 2221/2123; G06F 1/329
See application file for complete search history.

(56) References Cited

U.S. PATENT DOCUMENTS

| | | | | |
|---|---|---|---|---|
| 5,903,772 | A * | 5/1999 | White | G06F 9/30014 712/E9.021 |
| 6,862,677 | B1 * | 3/2005 | Stravers | G06F 9/3858 712/228 |
| 2005/0081073 | A1 * | 4/2005 | Williams | G06F 9/30083 712/E9.032 |
| 2014/0258686 | A1 * | 9/2014 | Fatemi | G06F 1/3296 712/216 |
| 2019/0034203 | A1 * | 1/2019 | Ardanaz | G06F 1/266 |
| 2023/0019271 | A1 * | 1/2023 | Mukherjee | G06F 1/329 |
| 2024/0419626 | A1 * | 12/2024 | Schumacher | G06F 15/7842 |

OTHER PUBLICATIONS

Lambert, Fred , "Tesla unveils new Dojo supercomputer so powerful it tripped the power grid", Electrek, [retrieved from the internet on Dec. 21, 2024], <https://electrek.co/2022/10/01/tesla-dojo-supercomputer-tripped-power-grid/.>, Oct. 1, 2022, 9 pages.

* cited by examiner

*Primary Examiner* — Hyun Soo Kim
(74) *Attorney, Agent, or Firm* — FIG. 1 Patents

(57) ABSTRACT

Computing system power surge mitigation is described. In one or more implementations, a processing device includes a hardware kernel that manages power consumption of the processing device by injecting stateless instructions into a processing pipeline. In one or more implementations, a system includes a hardware kernel configured to generate stateless instructions, and a processing device configured to manage power consumption of the system by executing the stateless instructions generated by the hardware kernel.

20 Claims, 8 Drawing Sheets

COMPUTING SYSTEM POWER SURGE MITIGATION

BACKGROUND

Data centers serve as hubs for hosting computing resources, such as servers, storage systems, networking equipment, and other hardware. These centers process data and execute computationally intensive tasks in support of various applications and digital services hosted on computing resources. For instance, a data center hosted application runs continuously for multiple days to train an artificial intelligence (AI) model. Ensuring a stable electrical supply that satisfies long-term power demands of model training or other computationally intensive tasks is challenging, especially during power surges that cause sudden electrical fluctuations and impact performance.

DETAILED DESCRIPTION

Figure 1:
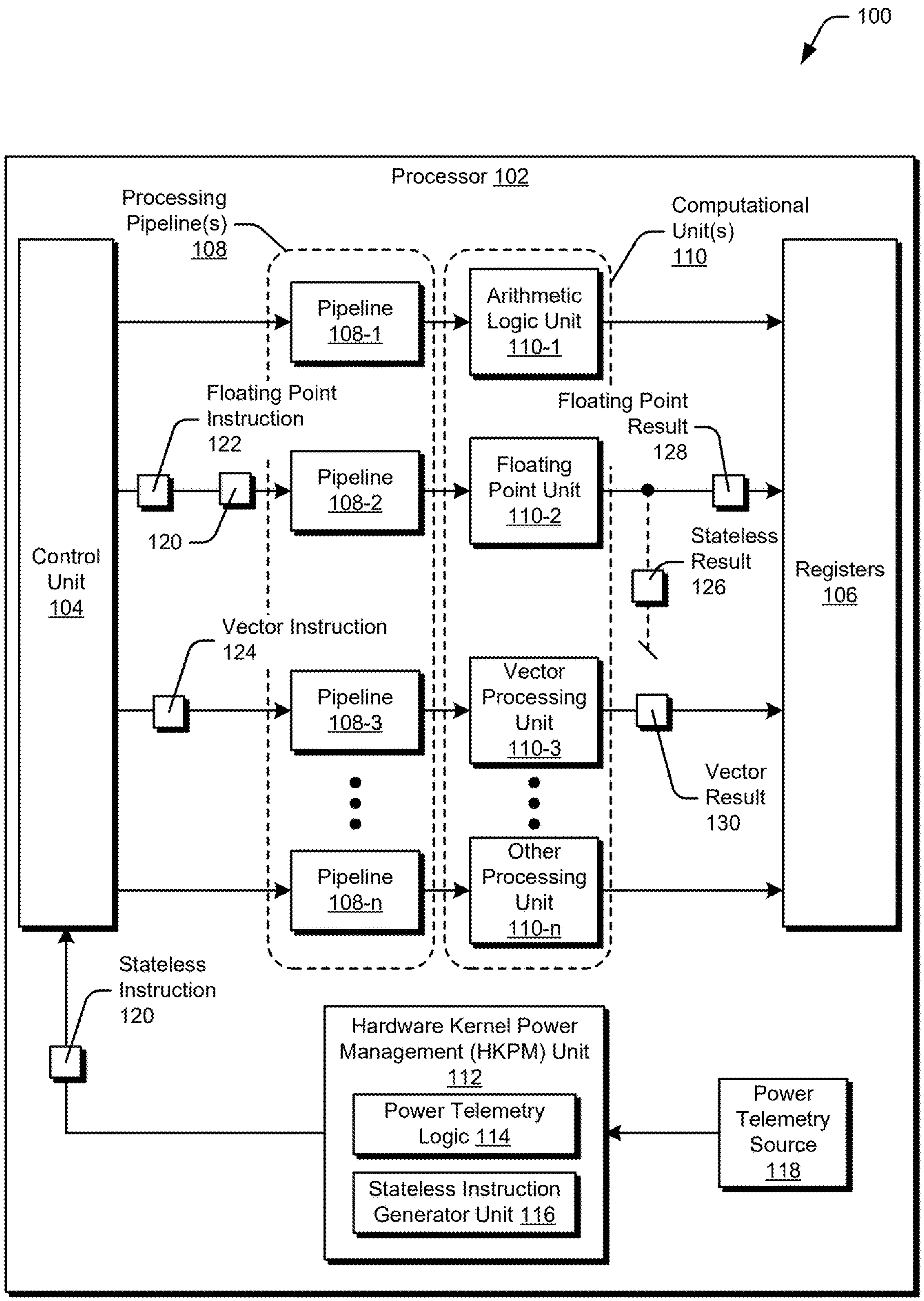
FIG. 1 is a block diagram of a non-limiting example system having a processing unit that is operable to implement computing system power surge mitigation.

Data centers workloads create power surges observable by utility companies. The surges are sometimes strong enough to cause a loss of power in data centers and surrounding neighborhoods. The power surges cause fluctuations in electricity supplied to clusters and individual nodes of the data center, which impacts program executions and decreases performance. A data center cluster, for instance, includes multiple nodes that are each operable to continuously execute an application or program for several hours or days, such as to train machine-learning models. When power supplies are unstable, these prolonged program executions are disrupted. For example, a short blip in electricity supplied to a node causes execution of the application to be interrupted and/or restarted, resulting in multiple hours or days of unrecoverable training time. Challenges exist to overcome intermittent power losses and fluctuations, which impact computing system (e.g., data center) performance.

The techniques described herein enable computing system power mitigation by stabilizing power consumption of hardware resources to remain within specified power profiles (e.g., power bands), which improves performance. As nodes in data center clusters execute instruction workloads, magnitudes of electrical spikes in power consumption are reduced, for instance, by implementing power floor and power limit control techniques. Instead of allowing sharp increases or decreases in power consumption, power levels at the nodes are carefully controlled and allowed to rise or fall in steps. With each step, a power level is maintained at a predefined power floor for a predefined amount of time. In at least one aspect, when a last step is reached, a power limit (e.g., a maximum power level) is sustained to allow maximum performance. This controlled maintenance and/or ramp up and ramp down of power consumption prevents electrical spikes from exceeding the power floor and power limits. This reduces occurrences of nodes abruptly transitioning between low and high power consuming states. Intermittent power demand or consumption spikes are maintained at voltage and current levels that electrical infrastructure near and within the data center or other computing system is able to handle. Power consumption is stabilized with an intent to improve performance, reliability, and support continuous and stable program execution.

In one or more examples, the power management techniques for controlling power levels are implemented by throttling workload instruction streams. For example, power consumption of a computing system (e.g., a node or cluster of nodes of a data center) is stabilized by managing an issue rate of workload or program instructions, which enables fine control over system power ramp ups or ramp downs.

To manage the issue rate, stateless instructions are issued in conjunction with program instructions. In at least one aspect, program instructions are preceded, interleaved, or followed in a shared processing pipeline by stateless instructions. In one or more variations, separate processing pipelines are used to execute the stateless instructions in parallel with the program instructions. Execution of the stateless instructions causes the computing system to consume power consistent with a power profile defined for the workload, without exceeding power capabilities of the computing system. On the other hand, stateless instructions do not change workload states, and therefore do not affect workload performance by displacing workload data from short term or long term data structures.

As used herein, the term "stateless instructions" refers to executable instructions, which upon execution, do not affect hardware states of computing systems (e.g., processing devices, clusters, nodes) or software states of workloads (e.g., programs, applications, threads) on which workload execution occurs. In contrast, the term "program instructions" refers to executable instructions, which upon execution, do affect hardware states of computing systems or software states of workloads on which workload execution occurs. In accordance with the described techniques, stateless instructions are issued during execution of program instructions to adjust power consumption, without impacting performance or integrity of program states maintained by hardware resources of the computing system. The program instructions affect the program states maintained by the hardware resources, while the stateless instructions are issued to affect power consumed by the hardware resources, e.g., during the execution of the program instructions. In one example, inserting stateless instructions into a processing pipeline stabilizes power consumption at specific power floors or limits when no program is executing, and in another example, throttles program execution to control increases to a power limit when programs executions resume. In another example the workload program execution is not throttled, rather an unused processing pipeline is utilized to execute the stateless instructions.

The stateless nature of each stateless instruction means execution of stateless instructions does not impact a program execution state hardware resources utilized in that state. As one example, stateless instructions cause no resultant write-backs over program specific register values, cache entries, memory data, or other information maintained during different states of a program execution. Instead, results of computations performed during execution of stateless instructions are immediately dropped. Results computed from executing the stateless instructions are not written to registers, cache systems, memory systems, or other storage systems for ensuring the state of the computing system is accurately preserved for the program execution. This state preservation of program or computing system resources enables a seamless transition between managing power consumption continuing program execution.

In one example, a system includes a processor, such as a central processing unit (CPU), a graphics processing unit (GPU), or other type of processing device. The processor is configurable to execute program instructions of one or more functional programs, such as, instructions of an application, a service, or a thread. When executing a program, the processor loads each program instructions into one or more processing pipelines. The processing pipelines extract the operands, parameters, and other information contained in the program instructions for configuring corresponding computational units of the processor to implement functions defined by the information contained in the instructions.

The system is operatively coupled to a power delivery subsystem (e.g., a power supply, a battery, a capacitor, or combination thereof) that delivers electricity to the processor. Power telemetry measured at the system and/or at the processor is received to determine power consumption during a program executions. For example, current measurements, voltage measurements, and changes in current and/or voltage measurements over time are non-limiting examples of power telemetry. The power telemetry in one or more aspects includes electrical information about aspects of the system that indicate an amount of power being consumed or from which the amount of power being consumed is derivable. Based on the power telemetry, stateless instructions are injected into one or more of the processing pipelines to force the power consumption of the processor to remain at a predefined power floor for a predefined amount of time.

In one or more examples, a processor includes a hardware kernel power management unit configured to generate and determine when to inject the stateless instructions into a processing pipeline, including to define attributes of the stateless instructions for achieving a specific power consumption. The stateless instructions, for instance, carry operand addresses or in-line operands. In various permutations of operand addresses and in-line operands, a stateless instruction is not back pressured by bandwidth constraints of a register data structure. The hardware kernel power management unit receives power telemetry to determine whether to issue stateless instructions and define the operands associated with the stateless instructions to achieve a particular power floor or power limit.

The power telemetry is obtained by the hardware kernel power management unit, in at least one example, from a firmware controller of the processor. The firmware controller is operable to intercept processor based, board based, node based, and/or rack based power telemetry information, combine the power telemetry information with the compute cluster power floor and power limit parameters (e.g., obtained from a power profile), and then instruct the hardware kernel power management unit on how to operate. In at least one other example, a processor of a node (e.g., CPU) has a software and/or firmware controller that intercepts board based, node based, and/or rack based power telemetry information, combines the power telemetry information with the compute cluster power floor and power limit parameters (e.g., obtained from a power profile), and then instructs the hardware kernel power management unit on how to operate.

When deviations in power consumption are detected from the power telemetry, the hardware kernel power management unit generates a stateless instruction for managing the deviations to stabilize the power consumption. The stateless instructions are output from the hardware kernel power management unit to a control unit of the processor, which issues the stateless instructions into a processing pipeline.

The stateless instructions are executed for various reasons. Stateless instructions are executed for slowing power consumption increases of a program execution. This enables controlled ramp ups that achieve power limits for improved performance, while maintaining operational limits of the overall system. In one or more aspects, stateless instructions are executed for slowing decreases in power consumption of program executions. This enables controlled ramp down or stabilization periods whereby maintaining power consumption at or near a particular power floor, the system remains in a state of readiness for handling imminent power consumption increases to improve performance.

Results computed from execution of the stateless instructions are ignored such that no write-back operations occur. The processor refrains from performing write-back operations of the results to not interfere with a program's control over registers, cache, memory and/or other hardware resources. When execution of the stateless instructions finish, program execution immediately continues without having to reconfigure hardware resource to return to the expected program states.

In one or more variations, a program, upon execution, is assigned a power profile. When the hardware kernel power management unit detects a deviation in power consumption based on the power telemetry, the hardware kernel power management unit generates one or more stateless instructions for balancing the power consumption to satisfy the power profile. In at least one example, the stateless instructions are generated based on power profiles that define durations of time (e.g., step periods) where the power consumption of a program is to be kept at or near a particular power floor (e.g., power level). In at least one aspect, the power profiles define amounts of time for maintaining the power consumption at or near a particular power limit (e.g., a maximum power level) regardless as to whether the program is operating closer to a power floor of a lower power execution state.

Consider an example where the processor of the system includes a plurality of processing pipelines. At least one of the pipelines feeds program instructions to a vector processing unit that executes matrix operations defined therein. So long as the power consumed during execution of the matrix operations remains stable and does not fluctuate, the hardware kernel power management unit refrains from generating stateless instructions to manage the power consumption.

If the power consumption attributed to the matrix operations being performed suddenly deviates, the hardware kernel power management unit generates stateless instructions that are injected into a separate processing pipeline, which feeds the floating point unit. The floating point unit executes the stateless instructions as a way to increase the processor's overall power consumption, which counteracts the reduced power consumed by the matrix operations. Execution of the stateless instructions therefore causes the power consumed by the processor to remain stable for improved performance.

In some aspects, the techniques described herein relate to a processing device that manages power consumption of the processing device by injecting stateless instructions into a processing pipeline.

In some aspects, the techniques described herein relate to a processing device, wherein the stateless instructions are injected into the processing pipeline to throttle execution of program instructions injected into the processing pipeline and control the power consumption.

In some aspects, the techniques described herein relate to a processing device, wherein the processing pipeline includes a plurality of pipelines, and the stateless instructions are injected into a first processing pipeline to manage the power consumption during execution of program instructions processed through a second processing pipeline.

In some aspects, the techniques described herein relate to a processing device, wherein the execution of the program instructions is stalled in the second processing pipeline and the stateless instructions are processed through the first processing pipeline to balance the power consumption while the execution of the program instruction is stalled.

In some aspects, the techniques described herein relate to a processing device, wherein the stateless instructions are generated based on power telemetry information measured during the execution of the program instructions.

In some aspects, the techniques described herein relate to a processing device, wherein the stateless instructions are floating point instructions, and the processing pipeline is a floating point pipeline.

In some aspects, the techniques described herein relate to a processing device, wherein the stateless instructions include one or more groups of individual stateless instructions injected in the processing pipeline to cause a specific amount of increase or decrease in the power consumption.

In some aspects, the techniques described herein relate to a processing device, wherein the processing device is a single processing node in a plurality of nodes of a processing cluster.

In some aspects, the techniques described herein relate to a processing device, wherein the processing device includes a hardware kernel unit configured to inject the stateless instructions into the processing pipeline to manage the power consumption.

In some aspects, the techniques described herein relate to a system including: a hardware kernel unit configured to generate stateless instructions, and a processing device configured to manage power consumption of the system by executing the stateless instructions generated by the hardware kernel unit.

In some aspects, the techniques described herein relate to a system, wherein the hardware kernel unit is configured to generate the stateless instructions based on power telemetry information measured at the processing device during execution of program instructions.

In some aspects, the techniques described herein relate to a system, wherein the hardware kernel unit is configured to obtain the power telemetry information from a power profile during the execution of the program instructions and generate the stateless instructions to maintain the power consumption within a power band defined by the power profile.

In some aspects, the techniques described herein relate to a system, wherein the processing device includes a plurality of processing pipelines and execute the stateless instructions using a first pipeline while executing program instructions using a second pipeline.

In some aspects, the techniques described herein relate to a system, wherein the processing device is configured to load the stateless instructions within an unused processing pipeline to throttle execution of program instructions being processed through another processing pipeline.

In some aspects, the techniques described herein relate to a system, wherein the processing device is configured to refrain from writing-back a result obtained from executing the stateless instructions.

In some aspects, the techniques described herein relate to a system, wherein the processing device is configured to discard a result obtained from executing the stateless instructions and refrain from writing the result to a register of the processing device.

In some aspects, the techniques described herein relate to a system, wherein the hardware kernel unit is configured to cease generating the stateless instructions when processing pipelines available for executing program instructions are unused for a threshold duration of time.

In some aspects, the techniques described herein relate to a method including: receiving, by a processing device, stateless instructions generated by a hardware kernel unit, and managing, by the processing device, power consumption by executing the stateless instructions.

In some aspects, the techniques described herein relate to a method, wherein the processing device is a single processing node in a processing cluster that includes a plurality of processing nodes, and the hardware kernel unit is a single hardware kernel unit associated with the processing cluster.

In some aspects, the techniques described herein relate to a method, wherein the processing device is a single processing node in a processing cluster that includes a plurality of processing nodes, and the hardware kernel unit is a single hardware kernel unit corresponding to the single processing node.

FIG. 1 is a block diagram of a non-limiting example system 100 having a processing unit that is operable to implement computing system power surge mitigation. The illustrated system 100 includes a processor 102. Although not shown in the drawing of FIG. 1, the processor 102 is, in some examples, operatively coupled to a cache system, a memory hardware, or other storage system. In one or more implementations, the processor 102 includes at least one processing core depicted as having a control unit 104, a plurality of registers 106, a plurality of processing pipelines 108, and a plurality of computational units 110. The processor 102 also includes a hardware kernel power management (HKPM) unit, which is labeled in FIG. 1 and referred to throughout this disclosure simply as HKPM unit 112. Also included in the processor 102 is a power telemetry source 118.

In accordance with the described techniques, components of the processor 102 are coupled to one another via a wired or wireless connections, which are depicted in the illustrated example of FIG. 1 as unidirectional or bidirectional arrows. Example wired connections include, but are not limited to, buses, e.g., a data bus, interconnects, traces, and planes. Examples of devices in which the system 100 is implemented include, but are not limited to, supercomputers and/or computer clusters of high-performance computing (HPC) environments, data centers, servers, personal computers, laptops, desktops, game consoles, set top boxes, tablets, smartphones, mobile devices, virtual and/or augmented reality devices, wearables, medical devices, systems on chips, and other computing systems. Examples of the processor 102 therefore include, but are not limited to, a central processing unit (CPU), a graphics processing unit (GPU), an inference processing unit (IPU), a field programmable gate array (FPGA), an accelerated processing unit (APU), a digital signal processor (DSP), or other type of processor used in one or more of the types of systems described above.

The processor 102 is an electronic circuit that includes the control unit 104 within one or more cores. The control unit 104 configures the processor 102 to perform various operations based on executable instructions received by the control unit 104. The control unit 104 is implemented in hardware (e.g., as an electrical circuit) alone or in combination with supporting execution of embedded firmware or software programed in the control unit 104. For example, in one or more implementations, the control unit 104 is configured to read program instruction (e.g., from memory, from cache, from storage) and cause execution of the program instructions to perform various operations of an application, a service, a thread or other program hosted on the processor 102.

The control unit 104 fetches each instruction inputs the instruction into one of the processing pipelines 108. Each of the processing pipelines 108 is an electrical circuit including hardware configured to pipeline instructions being fetched by the control unit 104 for execution by one or more of the computational units 110. Each of the computational units 110 is an electrical circuit including hardware configured to perform an operation or computation based on an instruction received from one or more of the processing pipelines 108. For example, the control unit 104 sends a non-floating point instruction to a processing pipeline 108-1, which feeds an arithmetic logic unit 110-1. The arithmetic logic unit 110-1 executes operations defined by the instruction received in the processing pipeline 108-1 and outputs one or more results to the registers 106. Writing the results to the registers 106 is referred to as a write-back operation, and includes writing a result to a register value, or multiple register values (e.g., to cause the result to be written in cache, memory, or other data storage). As depicted in the illustrated example of FIG. 1, the processing pipelines 108 also include a processing pipeline 108-1 that feeds a floating point unit 110-2, a processing pipeline 108-3 that feeds a vector processing unit 110-3, and one or more additional processing pipelines **108-*n* each feeding at least one other processing unit 110-*n***.

The power telemetry source 118 measures power telemetry of the system 100 and the processor 102, for instance, during execution of program instructions being processed by the one or more cores. In at least one aspect, the power telemetry information output from the power telemetry source 118 is measured internal at the processor 102 (e.g., on processor telemetry information) during execution of program instructions. In at least one other aspect, the power telemetry information output from the power telemetry source 118 is measured external to the processor 102 (e.g., off processor telemetry information or system telemetry information) during execution of program instructions. Examples of the power telemetry information include voltages, currents, impedances, and/or other electrical measurements that enable power consumption of the processor 102 and/or the system 100 to be derived during program executions. In at least one example, the processor 102 represents a node processor (e.g., a CPU) and includes a software and/or firmware controller (not illustrated) operable to intercepts board based, node based, and/or rack based power telemetry information. The software and/or firmware controller configures the processor 102 to combine the power telemetry information with power floor and power limit parameters of a cluster (e.g., obtained from a power profile), and then instructs the power telemetry source 118 and/or the HKPM unit 112 on how to operate.

The HKPM unit 112 is an electrical circuit including hardware configured to manage power consumption of the processor 102 and/or the system 100 by injecting stateless instructions into at least one of the processing pipelines 108. The HKPM unit 112 is implemented in hardware (e.g., as an electrical circuit) alone or in combination with supporting execution of embedded firmware or software programed in the HKPM unit 112. Power telemetry logic 114 of the HKPM unit 112 is used by a stateless instruction generator 116 to generate these stateless instructions for managing power consumption of the processor 102 and/or the system 100. The power telemetry logic 114 obtains the power telemetry information from the power telemetry source 118. Based on the power telemetry information, the stateless instruction generator 116 determines whether to generate at least one stateless instruction 120. The stateless instruction 120 is generated in response to detecting deficiencies in the power consumption derived from the power telemetry information. For example, when an abrupt change in power consumption is detected based on the power telemetry information, the stateless instruction 120 is generated by the HKPM unit 112 and injected via the control unit 104 into one of the processing pipelines 108.

In one or more aspects, the processor 102 includes a software/firmware controller that communicates with the HKPM unit 112 and provides hints or calculations, which enable the HKPM unit 112 to generate the stateless instruction 120. In one or more implementations, the stateless instruction 120 is injected into one of the processing pipelines 108 that is also utilized by the program instructions. The stateless instruction 120, for instance, is injected into the processing pipeline 108-2 ahead of a floating point instruction 122 executed as part of a program. The stateless instruction 120 is processed by the floating point unit 110-2 to throttle execution of the floating point instruction 122 injected into the processing pipeline 108-2, to execute after the stateless instruction 120.

In at least one variation, the stateless instruction 120 is injected into an unused pipeline of among the pipelines 108 that is not used during the execution of the program instructions. For example, the stateless instruction 120 is injected into the processing pipeline 108-2 to manage the power consumption during execution of program instructions (e.g., a vector instruction 124) injected into the processing pipeline 108-3 The control unit 104 processes the stateless instruction 120 and the vector instruction 124 in parallel using separate pipelines 108. The stateless result 126 is dropped and a vector result 130 computed during execution of the vector instruction 124 passes to the registers 106.

Upon completion of executing the stateless instruction 120, the computational units 110 (e.g., the floating point unit 110-2) outputs a stateless result 126. The processor 102 is configured to refrain from writing-back the stateless result 126 obtained from executing the stateless instruction 120. For example, the processor 102 discards the stateless result 126 and refrains from writing the result to the registers 106. The stateless result 126 is discarded to preserve the state of the registers 106 and other hardware resources of the system 100 and/or the processor 102. For example, a floating point result 128 is computed by and output from the floating point unit 110-2, which is stored by the registers 106. Recording of the floating point result 128 in the registers 106 is unencumbered by dropping the stateless result 126 from the execution path of the processor 102. An application associated with the program instructions, for instance, is stalled and stops running during power corrections caused by issuance of the stateless instruction 120, and then automatically resumes normal operations of the application without having to reconfigure the hardware resources of the processor 102 accordingly.

In one or more implementations, the processing pipelines 108 that receive the stateless instruction 120 are operable to determine based on the stateless instruction 120 whether the stateless result 126 is to be dropped before reaching the registers 106. For example, the processing pipeline 108-2 detects or identifies the stateless instruction 120 as being utilized to generate the stateless result 126 in various ways. The stateless instruction 120 is generated by the HKPM unit 112 to include a stateless identifier, a stateless operand, a stateless flag, a stateless bit, or other information that configures the stateless result 126 computed by the floating point unit 110-2 to drop out of the execution path of the core of the processor 102.

Figure 2:
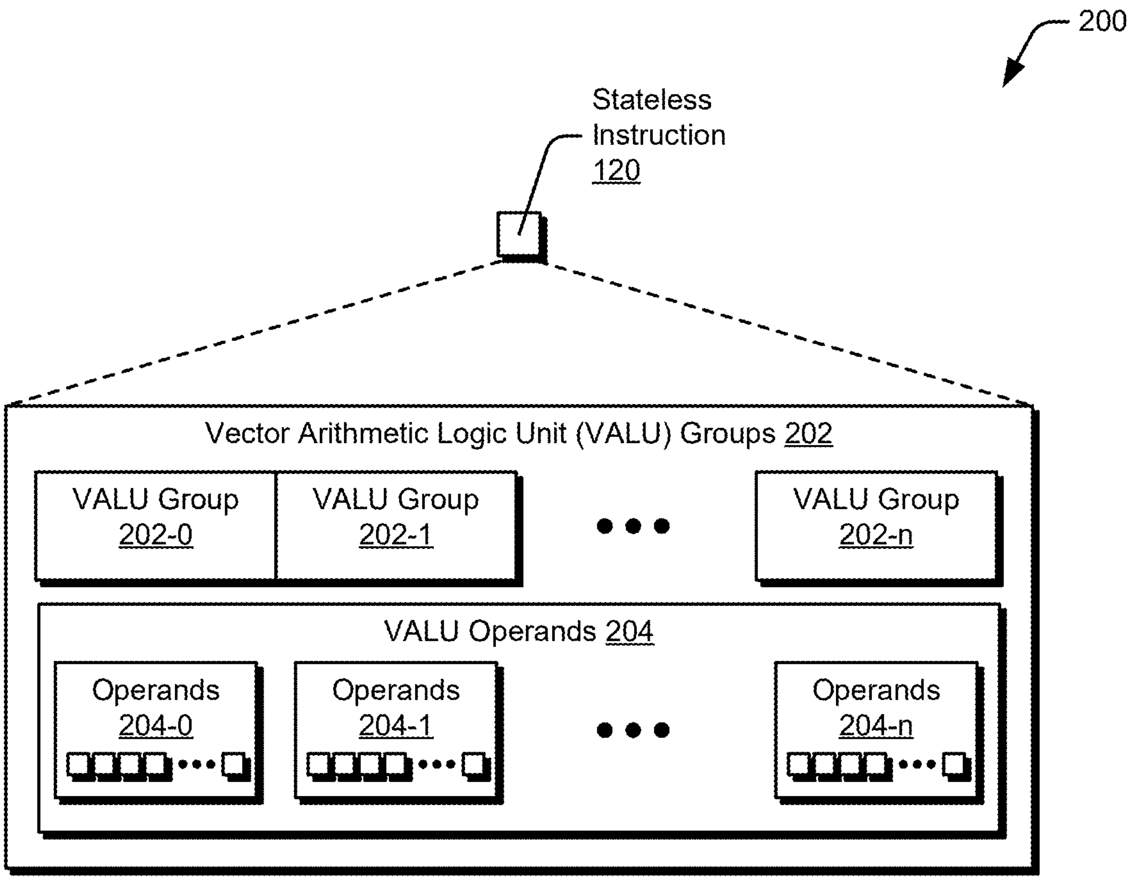
FIG. 2 is a block diagram of a non-limiting example of a stateless instruction generated for implementing computing system power surge mitigation.

FIG. 2 is a block diagram of a non-limiting example 200 of the stateless instruction 120 generated for implementing computing system power surge mitigation. The stateless instruction 120 depicted in FIG. 2 includes a plurality of vector arithmetic logic unit (VALU) groups, which are referred to simply and labeled as VALU groups 202.

The VALU groups 202 include a VALU group 202-0, a VALU group 202-1, and so on, up to and including a VALU group **202-*n*, where n is any integer. Each of the VALU groups 202 corresponds to one of a plurality of VALU operands 204 that each include multiple stateless instructions to be injected in the processing pipelines 108 for causing a specific amount of increase or decrease in the power consumption of the processor 102. For example, operands 204-0 include multiple stateless instructions that are independent of operands 204-1, and so forth, up to operands 204-*n*, which includes multiple stateless instructions that are independent of the other VALU operands 204. As one example, the stateless instruction 120 includes floating-point instructions, such as multiplication of two 32-bit floating-point values. Each of the VALU operands 204 in one of the VALU groups 202 commands the floating point unit 110-2** to perform a single 32-bit by 32-bit multiplication.

Each of the VALU groups 202 represents an equal percentage of the overall power consumption that is manageable by the HKPM unit 112. Controlling a quantity of the VALU groups 202 enables precise control over an amount increase in the power consumption of the processor 102 (e.g., from zero to one hundred percent). For example, with eight VALU groups 202 in total, issuing the stateless instruction 120 to enable all eight of the VALU groups 202 increases power consumption of the processor 102 by a maximum amount. If each of the operands 204 includes eight instructions, sixty four floating point calculations are performed, and results are discarded. Issuing the stateless instruction 120 to enable one of the VALU groups 202 causes power consumption of the processor 102 to increase by one eighth of the maximum amount achievable by enabling all eight of the VALU groups 202. If one of the VALU groups 202 includes eight instructions within the VALU operands 204, eight floating point calculations are performed, and results are discarded.

Figure 3:
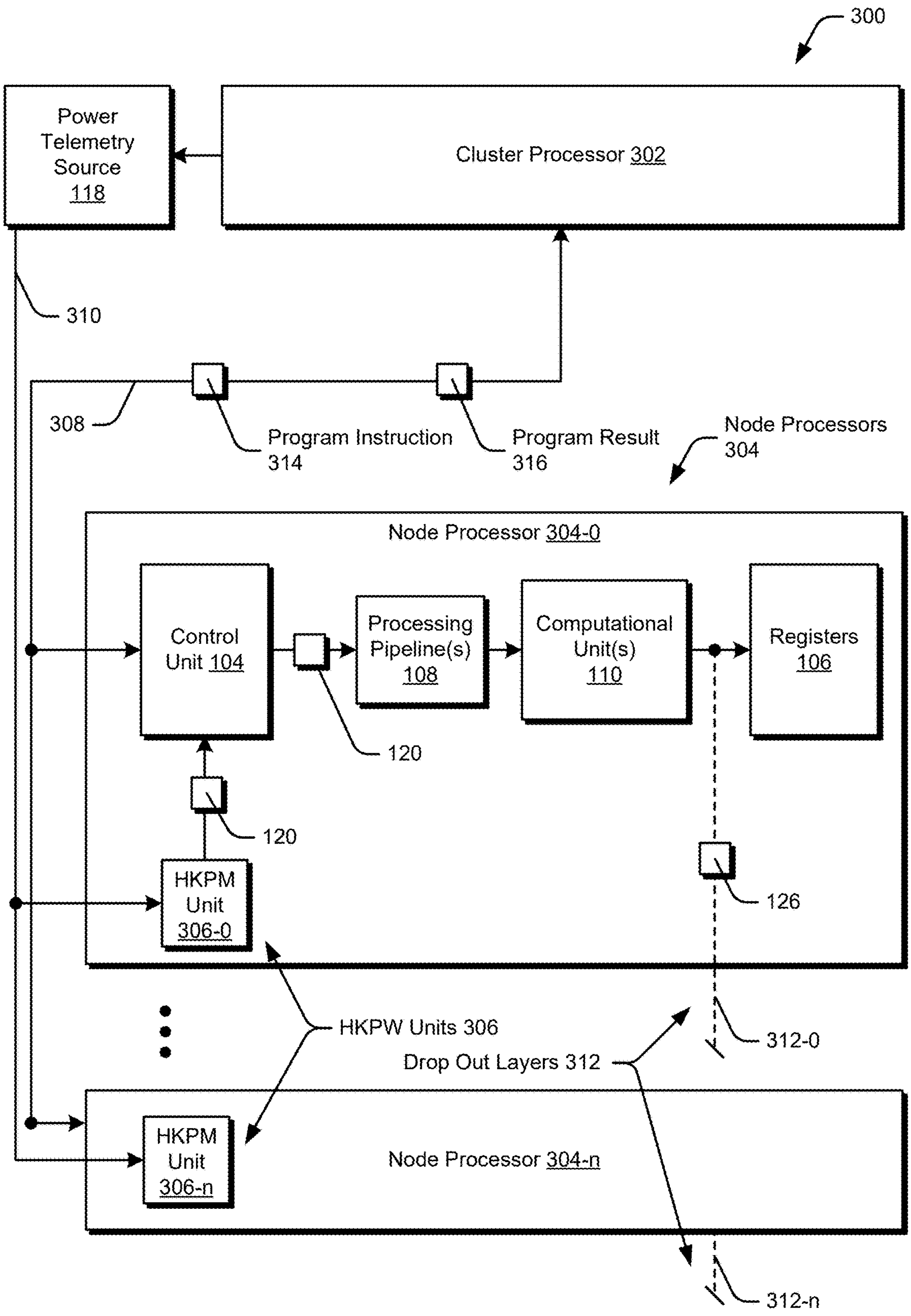
FIG. 3 is a block diagram of a non-limiting example system having a processing cluster that is operable to implement computing system power surge mitigation.

FIG. 3 is a block diagram of a non-limiting example system 300 having a processing cluster that is operable to implement computing system power surge mitigation. The processing cluster of the system 300 includes a single processor, labeled as a cluster processor 302, which is configured to manage a plurality of node processors 304 of the processing cluster.

Examples of the cluster processor 302 and the node processors 304 are inclusive of the types of processing devices mentioned above with respect to the processor 102. For ease of understanding the example implementation illustrated in FIG. 3, consider the system 300 to include a separate GPU for each of the node processors 304, and a CPU configured as the cluster processor 302 to individually manage each of the node processors 304.

The node processors 304 include up to a quantity of n processors, where n is any integer. Each of the node processors 304 includes similar hardware elements as those illustrated as part of node processor 304-0. For example, each of the node processor 304-0 through the node processor **304-*n* include the control unit 104, the processing pipelines 108, the computational units 110, and the registers 106. In addition, the node processors 304 include respective HKPM units 306, labeled as HKPM unit 306-0 through HKPM unit 306-*n*, as well as respective drop out layers 312, labeled as drop out layer 312-0 through drop out layer 312-*n***.

The HKPM units 306 at each of the node processors 304 generates stateless instructions to balance power consumption (e.g., keep the power consumption at a particular level) of that corresponding node processor. Each of the HKPM units 306 is an example of the HKPM unit 112. The HKPM units 306 are each implemented in hardware (e.g., as an electrical circuit) alone or in combination with supporting execution of embedded firmware or software programed in the HKPM units 306. For example, the HKPM unit 306-0 issues the stateless instruction 120 to balance the power consumption of the node processor 304-0 by causing a mitigating current decrease when current drawn by the node processor 304-0 increases, or by causing a mitigating current increase when the current drawn by the node processor 304-0 decreases. The stateless result 126 computed from executing the stateless instruction 120 is dropped from the node processor 304-0 via the drop out layer 312-0. The node processor **304-*n* performs similar operations by issuing the stateless instruction 120 generated from the HKPM unit 306-*n* and dropping the stateless result 126 computed from executing the stateless instruction 120 via the drop out layer 312-*n*. The drop out layers 312 enable the node processors 304 to refrain from writing-back (e.g., to the registers 106) the stateless result 126 obtained from executing the stateless instruction 120. The drop out layer 312, in one or more aspects, acts like a garbage collector that configures the node processors 304 to discard the stateless result 126 obtained from executing the stateless instruction 120 and refrain from writing the stateless result 126 to the registers 106 of the node processors 304**.

The cluster processor 302 shares a link or interface 308 with the control unit 104 of each of the node processors 304. The interface 308 is used by the cluster processor 302 to issue a program instruction 314 to one or more of the node processors 304, and receive a program result 316 generated in response to executing the program instruction 314.

The power telemetry source 118 is depicted in FIG. 3 as receiving power consumption information from the cluster processor 302, which in this example is operable to monitor overall power consumption of the node processors 304. In one or more implementations, the cluster processor 302 intercepts power telemetry information using a software or firmware controller. The software/firmware controller is operable to intercept processor based, board based, node based, and/or rack based power telemetry information, combine the power telemetry information with power floor and power limit parameters of the system 300 (e.g., obtained from a power profile), and then instructs the HKPM unit 112 on how to operate.

The power telemetry source 118 shares a link or interface 310 with the HKPM units 306 to send to the HKPM units 306 the power telemetry information derived from the power measurements taken with the cluster processor 302. The system 300 is therefore configured to generate stateless instructions based on power telemetry information measured at the cluster processor 302 during execution of the program instruction at the node processors 304.

In one or more implementations, the power telemetry source 118 maintains a power profile associated with a program or set of program instructions sent to the node processors 304 for execution. For example, the power profile is implemented as a table or group of registers with one or more entries that define power consumption characteristics for stable execution of a program. The cluster processor 302 initializes a program by causing the program to select a power profile from the power telemetry source 118. The selected power profile is received from the power telemetry source 118 and used by the HKPM units 306 to manage the power consumption of the node processors 304 when executing the program (e.g., when executing the program instruction 314). The HKPM units 306 receive power telemetry information from the power telemetry source 118 and/or the power profile that defines a power band for executing the program. The power profile, for instance, defines a power limit and a power floor for power consumption adjustments the HKPM units 306 cause by issuing the stateless instruction 120. As one example, the HKPM unit 306-0 issues the stateless instruction 120 to maintain power consumption of the node processor 304-0 to be within the power band (e.g., at or below the power limit and above the power floor) defined by the power profile. As power consumption decreases (e.g., due to an unstable power supply) the stateless instruction 120 is issued to cause superfluous calculations that cause an increase in the power consumption of the node processor 304-0 to balance the power consumption of the node processor 304-0, overall.

Figure 4:
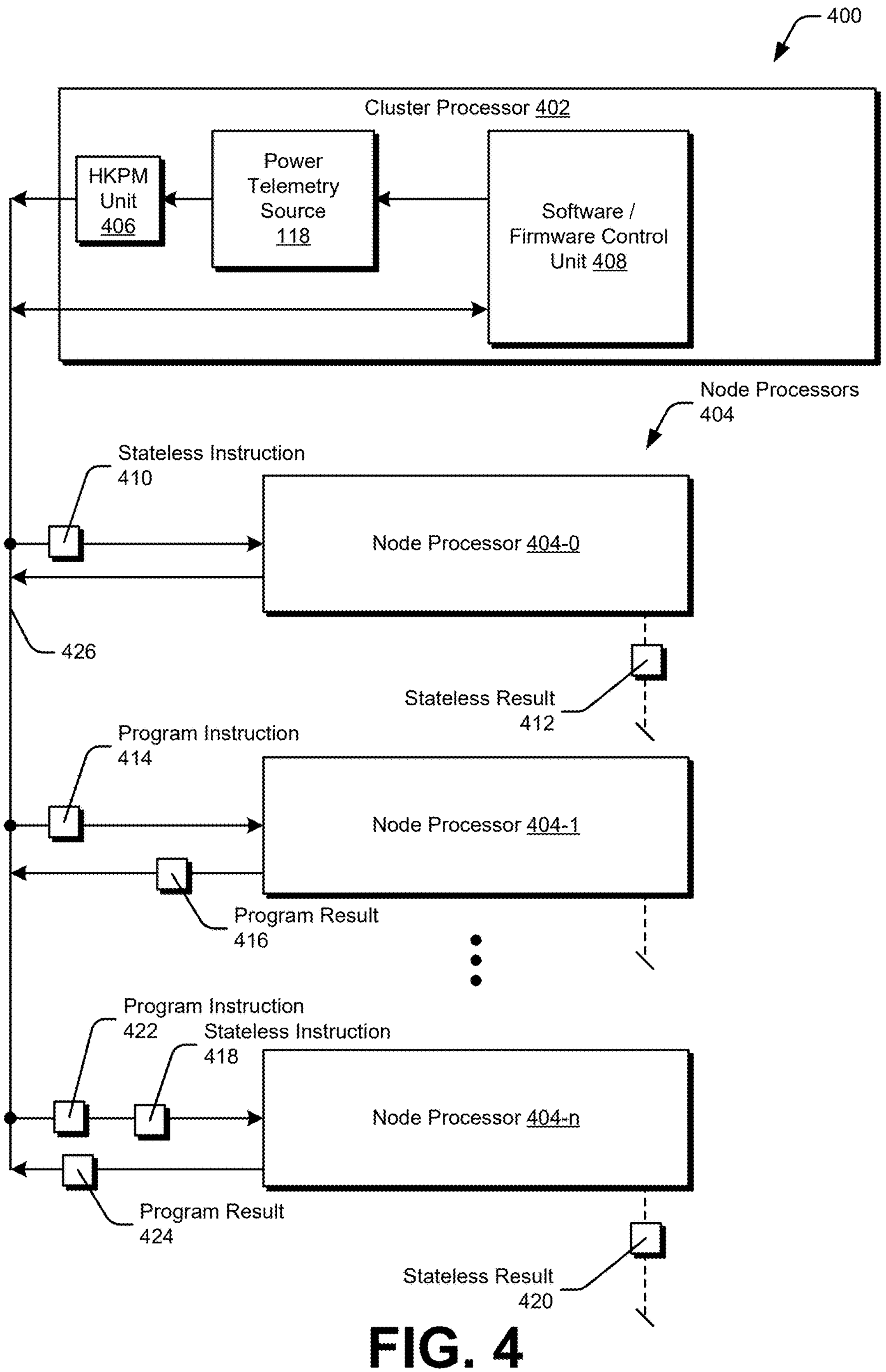
FIG. 4 is a block diagram of another non-limiting example system having a processing cluster that is operable to implement computing system power surge mitigation.

FIG. 4 is a block diagram of another non-limiting example system 400 having a processing cluster that is operable to implement computing system power surge mitigation. The processing cluster of the system 400 includes a cluster processor 402 configured to manage a plurality of node processors 404. Examples of the cluster processor 402 and the node processors 404 are inclusive of the types of processing devices mentioned above with respect to the processor 102. For ease of understanding the example implementation illustrated in FIG. 4, the system 400 includes a separate GPU for each of the node processors 404, and a CPU configured as the cluster processor 402 to individually manage each of the node processors 404.

In contrast to the system 300, where the node processors 304 each include one of the HKPM units 306, the system 400 includes a single HKPM unit, labeled as HKPM unit 406, which is integrated within the cluster processor 402. The HKPM unit 406 is an example of the HKPM unit 112 or one of the HKPM units 306. The HKPM unit 406 is implemented in hardware (e.g., as an electrical circuit) alone or in combination with supporting execution of embedded firmware or software programed in the HKPM unit 406. The cluster processor 402 also includes a software/firmware control unit 408 that sends power consumption measurements to the power telemetry source 118 within the cluster processor 402.

The power telemetry source 118 is depicted in FIG. 4 as receiving power consumption information from the software/firmware control unit 408, which in this example is operable to monitor overall power consumption of the cluster processor 402 and each of the node processors 404. In one or more implementations, the software/firmware control unit 408 intercepts power telemetry information including but not limited to information about processor based, board based, node based, and/or rack based power telemetry information. The software/firmware control unit 408 combines the power telemetry information with power floor and power limit parameters of the system 400 (e.g., obtained from a power profile), and then sends the power telemetry information to the power telemetry source 118 or directly to the HKPM unit 406, to instruct the HKPM unit 406 on how to operate.

In one or more examples, the power telemetry source 118 generates power telemetry on behalf of the HKPM unit 406. The HKPM unit 406 generates stateless instructions issued to the node processors 404, and stateless results are dropped. The software/firmware control unit 408 issues program instructions to the node processors 404 and receives program results in return.

Communication of the stateless instructions, the program instructions, and the program results between the cluster processor 402 and each of the node processors 404 occurs over an interface or link 426. The interface or link 426 is operable to transfer the stateless instructions and the program instructions to the node processors 404, and further operable to return program results generated in response to executing the program instructions, back to the software/firmware control unit 408.

In this example, the stateless instruction 410 is output from the HKPM unit 406 to cause the node processor 404-0 to perform work that impacts power consumption of the system 400. The stateless instruction 410 is processed and a stateless result 412 is dropped.

Next, turning to the node processor 404-1, the software/firmware control unit 408 issues a program instruction 414 for execution by the node processor 404-1. A program result 416 is generated in response to executing the program instruction 414, and the program result 416 is returned over the interface or link 426, back to the software/firmware control unit 408.

The node processor **404-*n* receives a stateless instruction 418 and a program instruction 422 over the interface or link 426. A stateless result 420 generated in response to executing the stateless instruction 418 is dropped by the node processor 404-*n*. A program result 424 generated in response to executing the program instruction 418 is returned to the software/firmware control unit 408 over the interface or link 426**.

In one or more examples, the software/firmware control unit 408 manages power profiles associated with programs executing at the node processors 404. The HKPM unit 406, in one or more aspects, receives power telemetry information from the power telemetry source 118 that indicates whether each of the node processors 404 is consuming power at an appropriate level defined by the power profile set for the program being executed thereon. The HKPM unit 406 issues the stateless instruction 410, for example, to increase power consumption of the system 400, without interfering with execution of the program instruction 414 or the program instruction 422 being executed by the node processors 404-1 and 404-*n*, respectively. When the stateless instruction 418 is executed by the node processor 404-*n*, the stateless result 420 is dropped so as to preserve the state or hardware resource conditions expected by the program execution of the program instruction 422. The system 400 streamlines power consumption management of the system 400 while facilitating program execution of the program instruction 414 and the program instruction 422.

Figure 5:
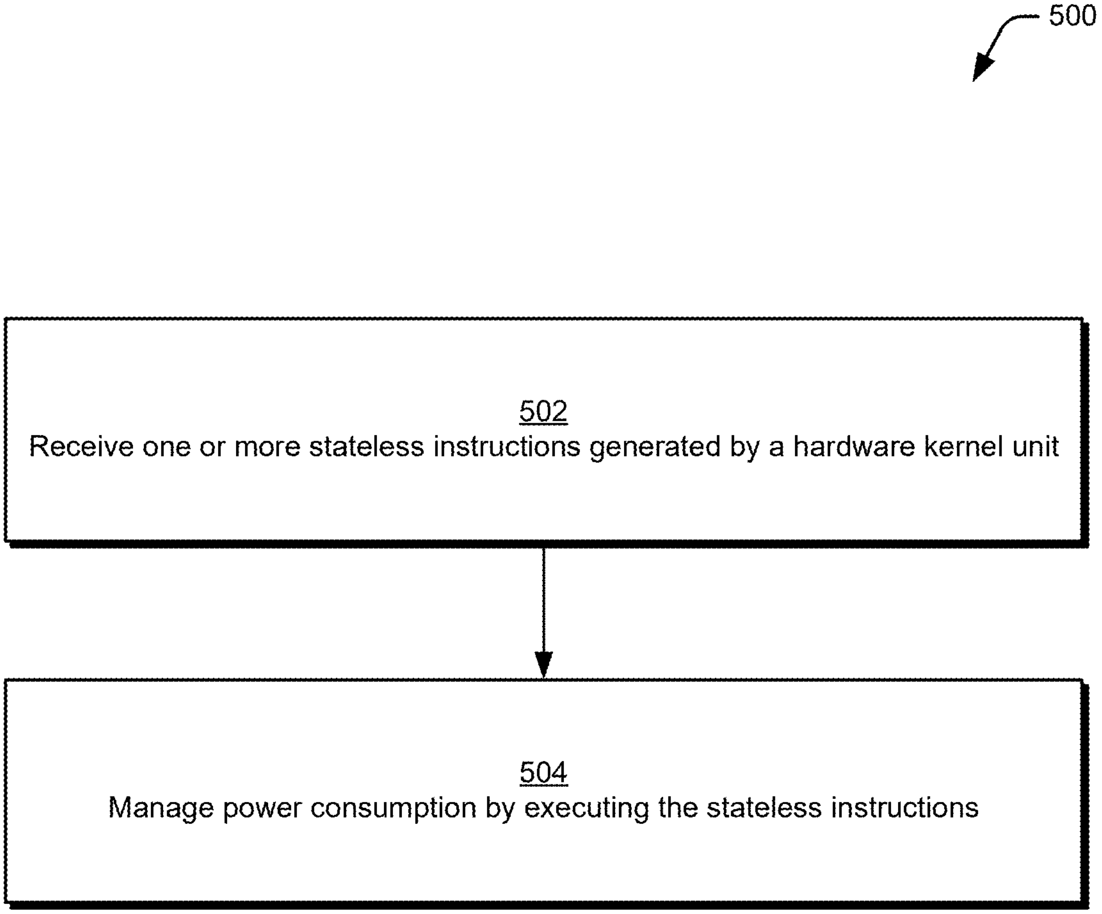
FIG. 5 depicts flow chart of a procedure executed by a processing unit that is operable to implement computing system power surge mitigation.

FIG. 5 depicts flow chart of a procedure 500 executed by a processing unit that is operable to implement computing system power surge mitigation. The procedure 500 depicted in FIG. 5 is described as being performed by the processor 102 of the system 100. In other examples, one or more of the cluster processor 302, the node processors 304, the cluster processor 402, and the node processors 404 implement the steps of the procedure 500.

The procedure 500 begins and proceeds to block 502. At block 502, the processor 102 receives the stateless instruction 120 generated by the hardware kernel unit (e.g., the HKPM unit 112). The procedure 500 ends at block 504 where the processor 102 manages power consumption of the system 100 by executing the stateless instruction 120.

Figure 6:
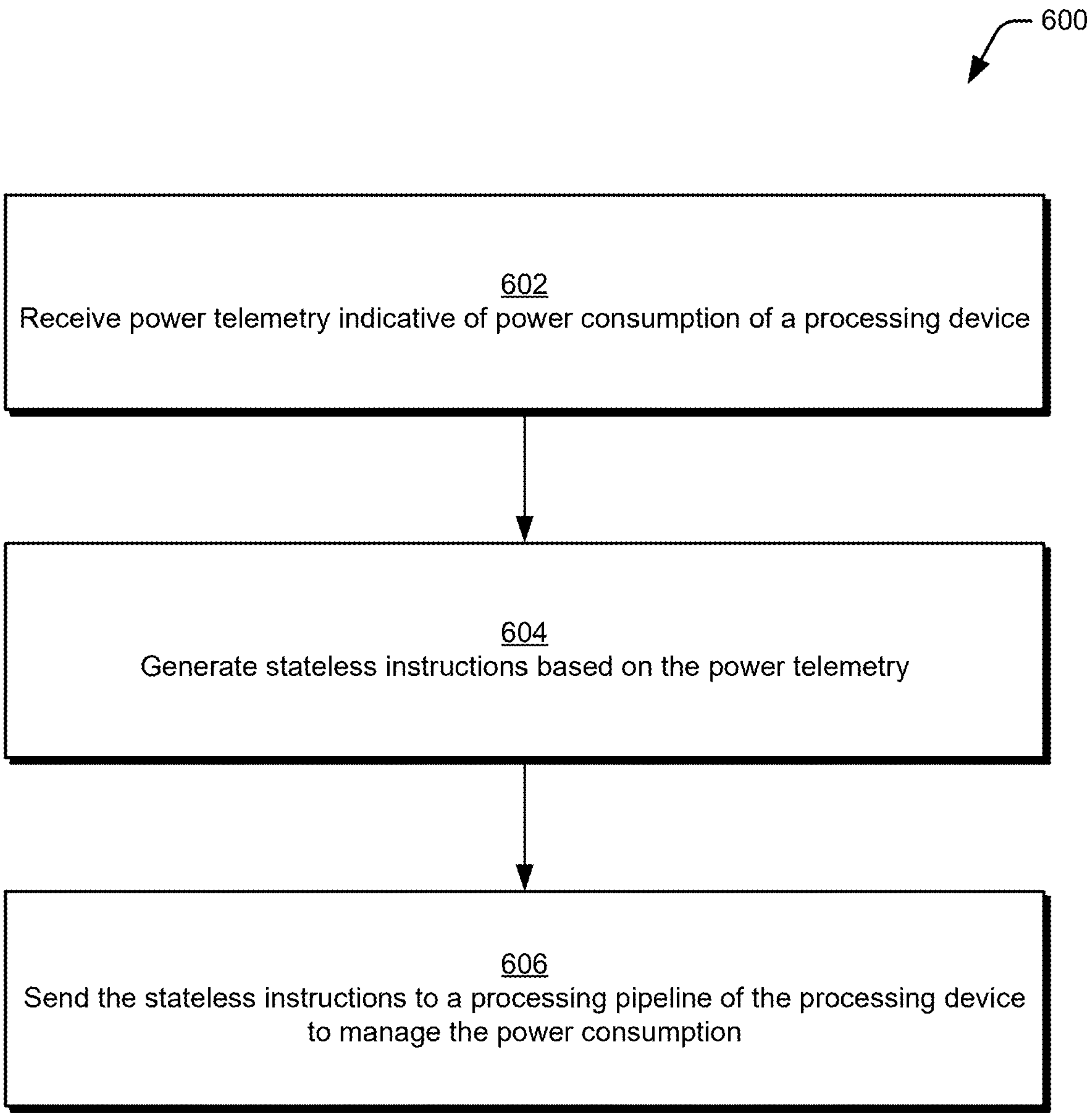
FIG. 6 depicts flow chart of a procedure executed by a hardware kernel power management unit that is operable to generate stateless instructions to implement computing system power surge mitigation.

FIG. 6 depicts flow chart of a procedure 600 executed by a hardware kernel power management unit of a processing unit that is operable to generate stateless instructions to implement computing system power surge mitigation. The procedure 600 depicted in FIG. 6 is described as being performed by the HKPM unit 112 of the system 100. In other examples, one or more of the HKPM units 306 and the HKPM unit 406 implement the steps of the procedure 600.

The procedure 600 begins and proceeds to block 602. At block 602, the HKPM unit 112 receives power telemetry information indicative of power consumption of the processor 102. For example, the power telemetry is based on power information intercepted by the processor 102, the cluster processor 302, the node processors 304, the cluster processor 402, or the note processors 404. Based on the power information intercepted by one or more of the above processing units, control commands (e.g., including the power telemetry) is issued to the HKPM unit 112.

Next, at block 604, the HKPM unit 112 generates a stateless instruction 120 based on the power telemetry information received from the previous step. The procedure 600 ends at block 606 where the stateless instruction is sent to one or more of the processing pipelines 108 to manage the power consumption of the processor 102.

In one or more examples, the HKPM unit 112 is configured to cease generating the stateless instructions when processing pipelines available on the processor 102 for executing program instructions are empty and unused for a threshold duration of time. For example, execution of program instructions is stalled (e.g., stopped for a period of time) or not actively being processed through a pipeline. If the HKPM unit 112 is generating stateless instructions to inject power into the system 100, while there is no active workload running on the processor 102 or the workload is stalled, then the power telemetry is not likely to differentiate. The HKPM unit 112, in one or more aspects, determines (e.g., from information obtained from the control unit 104, from information obtained form the power telemetry source 118) that none of the processing pipelines 108 are being utilized to process program instructions of a workload. After a period of time of issuing stateless instructions, the HKPM unit 112 determines whether the processing pipelines 108 have gone unused for processing a workload for a threshold duration of time. Responsive to determining the processing pipelines 108 are empty or unused for an amount of time that satisfies the threshold, then HKPM unit 112 issues stateless instructions that cause the power consumption of the processor to decrease or power down, as specified by a cluster or data center administrator. Information specified by the cluster or data center administrator causes the HKPM unit 112 to follow a power profile that specifies a power consumption roll-down-rate.

Figure 7:
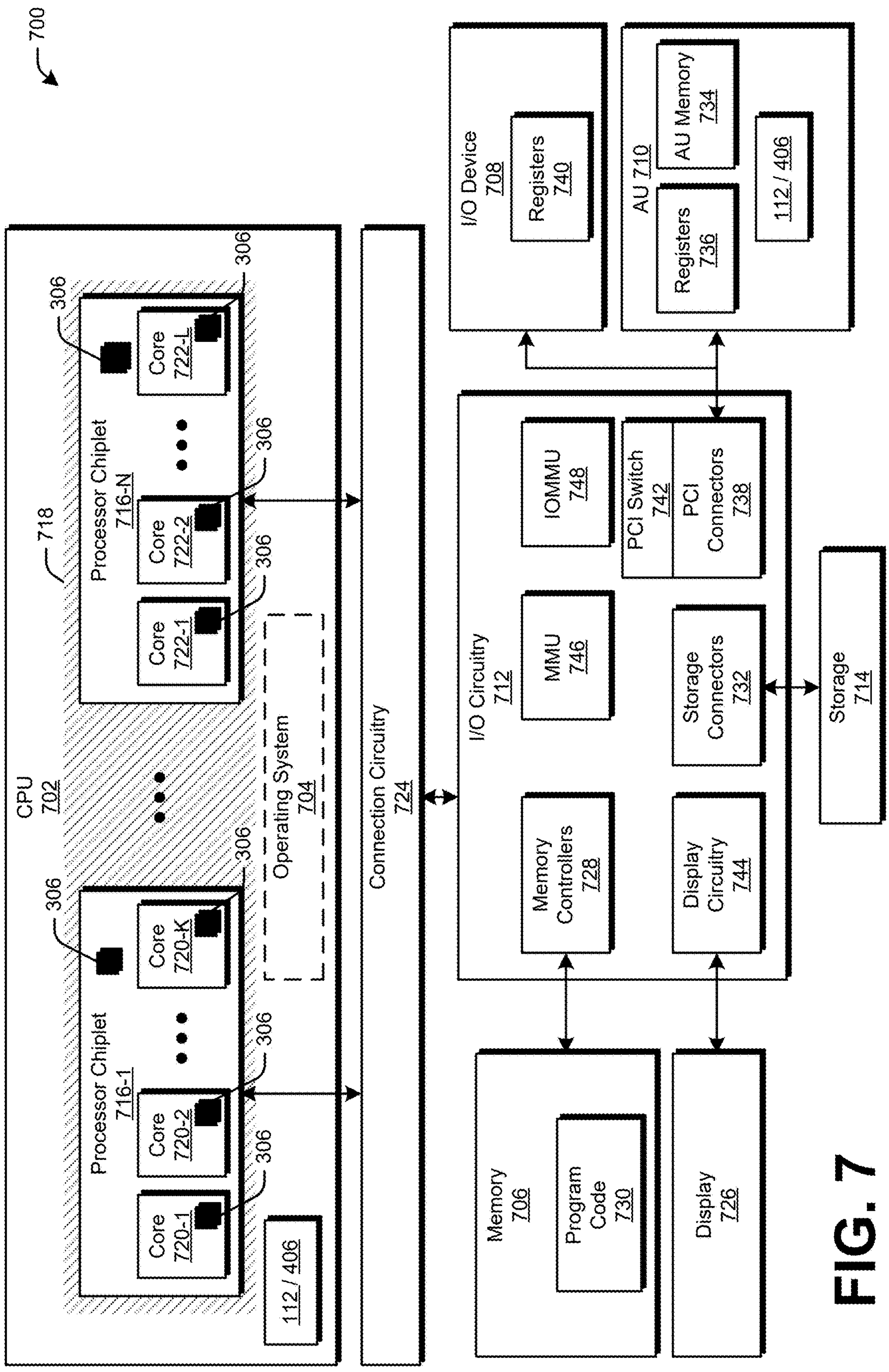
FIG. 7 is a block diagram of a processing system configured to execute one or more applications, in accordance with one or more implementations.

FIG. 7 includes a processing system 700 configured to execute one or more applications, such as compute applications (e.g., machine-learning applications, neural network applications, high-performance computing applications, databasing applications, gaming applications), graphics applications, and the like. Examples of devices in which the processing system is implemented include, but are not limited to, a server computer, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer or computer for another type of vehicle, a networking device, a medical device or system, and other computing devices or systems.

In the illustrated example, the processing system 700 includes a central processing unit (CPU) 702. In one or more implementations, the CPU 702 is configured to run an operating system (OS) 704 that manages the execution of applications. For example, the OS 704 is configured to schedule the execution of tasks (e.g., instructions) for applications, allocate portions of resources (e.g., system memory 706, CPU 702, input/output (I/O) device 708, accelerator unit (AU) 710, storage 714) for the execution of tasks for the applications, provide an interface to I/O devices (e.g., I/O device 708) for the applications, or any combination thereof.

In this example, the HKPM unit 112, the HKPM units 306, and HKPM unit 406 are each depicted in the processing system 700. In variations, however, one or more of the HKPM unit 112, the HKPM units 306, and HKPM unit 406 are included in and/or is implemented by one or more components of the processing system 700, such as the CPU 702, the memory 706, the I/O device 708, the AU 710, the I/O circuitry 712, the storage 714, and so forth. In at least one implementation, the HKPM unit 112, the HKPM units 306, and HKPM unit 406 are or portions of one or more of the HKPM unit 112, the HKPM units 306, and HKPM unit 406 are included in at least two of the depicted components of the processing system 700. By way of example, one or more of the HKPM unit 112, the HKPM units 306, and HKPM unit 406 are may be included in or otherwise implemented by at least the CPU 702 and the AU 710.

The CPU 702 includes one or more processor chiplets 716, which are communicatively coupled together by a data fabric 718 in one or more implementations. Each of the processor chiplets 716, for example, includes one or more processor cores 720, 722 configured to concurrently execute one or more series of instructions, also referred to herein as "threads," for an application. By way of example, one or more of the HKPM unit 112, the HKPM units 306, and HKPM unit 406 are may be included in or otherwise implemented by one or more of the processor chiplets 716 and the processor cores 720, 722. Further, the data fabric 718 communicatively couples each processor chiplet 716-N of the CPU 702 such that each processor core (e.g., processor cores 720) of a first processor chiplet (e.g., 716-1) is communicatively coupled to each processor core (e.g., processor cores 722) of one or more other processor chiplets 716. Though the example embodiment presented in FIG. 7 shows a first processor chiplet (716-1) having three processor cores (720-1, 720-2, 720-K) representing a K number of processor cores 722 and a second processor chiplet (716-N) having three processor cores (e.g., 722-1, 722-2, 722-L) representing an L number of processor cores 722, in other implementations (L being an integer number greater than or equal to one), each processor chiplet 716 may have any number of processor cores 720, 722. For example, each processor chiplet 716 can have the same number of processor cores 720, 722 as one or more other processor chiplets 716, a different number of processor cores 720, 722 as one or more other processor chiplets 716, or both.

Examples of connections which are usable to implement data fabric include but are not limited to, buses (e.g., a data bus, a system, an address bus), interconnects, memory channels, through silicon vias, traces, and planes. Other example connections include optical connections, fiber optic connections, and/or connections or links based on quantum entanglement.

Additionally, within the processing system 700, the CPU 702 is communicatively coupled to an I/O circuitry 712 by a connection circuitry 724. For example, each processor chiplet 716 of the CPU 702 is communicatively coupled to the I/O circuitry 712 by the connection circuitry 724. The connection circuitry 724 includes, for example, one or more data fabrics, buses, buffers, queues, and the like. The I/O circuitry 712 is configured to facilitate communications between two or more components of the processing system 700 such as between the CPU 702, system memory 706, display 726, universal serial bus (USB) devices, peripheral component interconnect (PCI) devices (e.g., I/O device 708, AU 710), storage 714, and the like.

As an example, system memory 706 includes any combination of one or more volatile memories and/or one or more non-volatile memories, examples of which include dynamic random-access memory (DRAM), static random-access memory (SRAM), non-volatile RAM, and the like. To manage access to the system memory 706 by CPU 702, the I/O device 708, the AU 710, and/or any other components, the I/O circuitry 712 includes one or more memory controllers 728. These memory controllers 728, for example, include circuitry configured to manage and fulfill memory access requests issued from the CPU 702, the I/O device 708, the AU 710, or any combination thereof. Examples of such requests include read requests, write requests, fetch requests, pre-fetch requests, or any combination thereof. That is to say, these memory controllers 728 are configured to manage access to the data stored at one or more memory addresses within the system memory 706, such as by CPU 702, the I/O device 708, and/or the AU 710.

When an application is to be executed by processing system 700, the OS 704 running on the CPU 702 is configured to load at least a portion of program code 730 (e.g., an executable file) associated with the application from, for example, a storage 714 into system memory 706. This storage 714, for example, includes a non-volatile storage such as a flash memory, solid-state memory, hard disk, optical disc, or the like configured to store program code 730 for one or more applications.

To facilitate communication between the storage 714 and other components of processing system 700, the I/O circuitry 712 includes one or more storage connectors 732 (e.g., universal serial bus (USB) connectors, serial AT attachment (SATA) connectors, PCI Express (PCIe) connectors) configured to communicatively couple storage 714 to the I/O circuitry 712 such that I/O circuitry 712 is capable of routing signals to and from the storage 714 to one or more other components of the processing system 700.

In association with executing an application, in one or more scenarios, the CPU 702 is configured to issue one or more instructions (e.g., threads) to be executed for an application to the AU 710. The AU 710 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 710 includes one or more compute units that concurrently execute one or more threads of an application and store data resulting from the execution of these threads in AU memory 734. This AU memory 734, for example, includes any combination of one or more volatile memories and/or non-volatile memories, examples of which include caches, video RAM (VRAM), or the like. In one or more implementations, these compute units are also configured to execute these threads based on the data stored in one or more physical registers 736 of the AU 710.

To facilitate communication between the AU 710 and one or more other components of processing system 700, the I/O circuitry 712 includes or is otherwise connected to one or more connectors, such as PCI connectors 738 (e.g., PCIe connectors) each including circuitry configured to communicatively couple the AU 710 to the I/O circuitry such that the I/O circuitry 712 is capable of routing signals to and from the AU 710 to one or more other components of the processing system 700. Further, the PCIe connectors 738 are configured to communicatively couple the I/O device 708 to the I/O circuitry 712 such that the I/O circuitry 712 is capable of routing signals to and from the I/O device 708 to one or more other components of the processing system 700.

By way of example and not limitation, the I/O device 708 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 708 is configured to execute one or more operations, tasks, instructions, or any combination thereof based on one or more physical registers 740 of the I/O device 708. In one or more implementations, such physical registers 740 are configured to maintain data (e.g., operands, instructions, values, variables) indicating one or more operations, tasks, or instructions to be performed by the I/O device 708.

To manage communication between components of the processing system 700 (e.g., AU 710, I/O device 708) that are connected to PCI connectors 738, and one or more other components of the processing system 700, the I/O circuitry 712 includes PCI switch 742. The PCI switch 742, for example, includes circuitry configured to route packets to and from the components of the processing system 700 connected to the PCI connectors 738 as well as to the other components of the processing system 700. As an example, based on address data indicated in a packet received from a first component (e.g., CPU 702), the PCI switch 742 routes the packet to a corresponding component (e.g., AU 710) connected to the PCI connectors 738.

Based on the processing system 700 executing a graphics application, for instance, the CPU 702, the AU 710, or both are configured to execute one or more instructions (e.g., draw calls) such that a scene including one or more graphics objects is rendered. After rendering such a scene, the processing system 700 stores the scene in the storage 714, displays the scene on the display 726, or both. The display 726, for example, includes a cathode-ray tube (CRT) display, liquid crystal display (LCD), light emitting diode (LED) display, organic light emitting diode (OLED) display, or any combination thereof. To enable the processing system 700 to display a scene on the display 726, the I/O circuitry 712 includes display circuitry 744. The display circuitry 744, for example, includes high-definition multimedia interface (HDMI) connectors, DisplayPort connectors, digital visual interface (DVI) connectors, USB connectors, and the like, each including circuitry configured to communicatively couple the display 726 to the I/O circuitry 712. Additionally or alternatively, the display circuitry 744 includes circuitry configured to manage the display of one or more scenes on the display 726 such as display controllers, buffers, memory, or any combination thereof.

Further, the CPU 702, the AU 710, or both are configured to concurrently run one or more virtual machines (VMs), which are each configured to execute one or more corresponding applications. To manage communications between such VMs and the underlying resources of the processing system 700, such as any one or more components of processing system 700, including the CPU 702, the I/O device 708, the AU 710, and the system memory 706, the I/O circuitry 712 includes memory management unit (MMU) 746 and input-output memory management unit (IOMMU) 748. The MMU 746 includes, for example, circuitry configured to manage memory requests, such as from the CPU 702 to the system memory 706. For example, the MMU 746 is configured to handle memory requests issued from the CPU 702 and associated with a VM running on the CPU 702. These memory requests, for example, request access to read, write, fetch, or pre-fetch data residing at one or more virtual addresses (e.g., guest virtual addresses) each indicating one or more portions (e.g., physical memory addresses) of the system memory 706. Based on receiving a memory request from the CPU 702, the MMU 746 is configured to translate the virtual address indicated in the memory request to a physical address in the system memory 706 and to fulfill the request. The IOMMU 748 includes, for example, circuitry configured to manage memory requests (memory-mapped I/O (MMIO) requests) from the CPU 702 to the I/O device 708, the AU 710, or both, and to manage memory requests (direct memory access (DMA) requests) from the I/O device 708 or the AU 710 to the system memory 706. For example, to access the registers 740 of the I/O device 708, the registers 736 of the AU 710, and/or the AU memory 734, the CPU 702 issues one or more MMIO requests. Such MMIO requests each request access to read, write, fetch, or pre-fetch data residing at one or more virtual addresses (e.g., guest virtual addresses) which each represent at least a portion of the registers 740 of the I/O device 708, the registers 736 of the AU 710, or the AU memory 734, respectively. As another example, to access the system memory 706 without using the CPU 702, the I/O device 708, the AU 710, or both are configured to issue one or more DMA requests. Such DMA requests each request access to read, write, fetch, or pre-fetch data residing at one or more virtual addresses (e.g., device virtual addresses) which each represent at least a portion of the system memory 706. Based on receiving an MMIO request or DMA request, the IOMMU 748 is configured to translate the virtual address indicated in the MMIO or DMA request to a physical address and fulfill the request.

In variations, the processing system 700 can include any combination of the components depicted and described. For example, in at least one variation, the processing system 700 does not include one or more of the components depicted and described in relation to FIG. 7. Additionally or alternatively, in at least one variation, the processing system 700 includes additional and/or different components from those depicted. The 700 is configurable in a variety of ways with different combinations of components in accordance with the described techniques.

Figure 8:
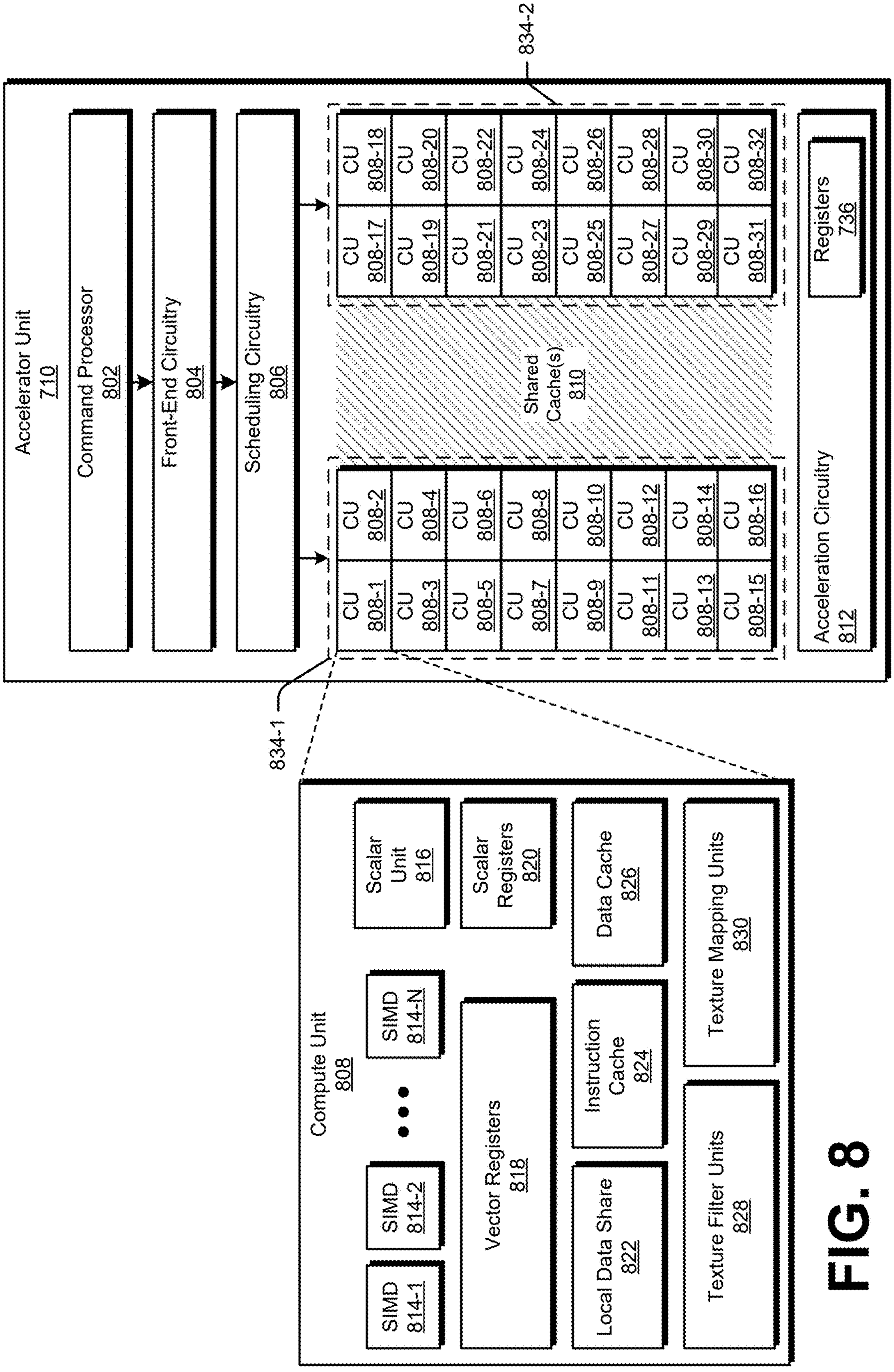
FIG. 8 is a block diagram of an accelerator unit (AU) configured to perform workloads for applications running on a processing system, in accordance with one or more implementations.

FIG. 8 depicts the AU 710, which is configured to execute workloads for one or more applications running on a processing system, such as the processing system 800. These applications include, for example, compute applications and/or graphics applications, each configured to issue respective series of instructions, also referred to herein as "threads," to a central processing unit (e.g., the CPU 802) of the processing system. Compute applications, when executed by a processing system, cause the processing system to perform one or more computations, such as machine-learning, neural network, high-performance computing, or databasing computations.

Further, graphics applications, when executed by a processing system, cause the processing system to render a scene including one or more graphics objects and, as an example, output the scene on a display, such as the display 726. The instructions issued to the CPU from these applications, for example, include groups of threads, also referred to herein as "workgroups," to be executed by AU 710. To perform these workgroups, the AU 710 includes one or more vector processors, coprocessors, graphics processing units (GPUs), general-purpose GPUs, non-scalar processors, highly parallel processors, artificial intelligence (AI) processors, inference engines, machine-learning processors, or any combination thereof. As an example, the AU 710 includes one or more command processors 802, front-end circuitry 804, scheduling circuitry 806, compute units 808, shared cache(s) 810, and acceleration circuitry 812.

A command processor 802 of AU 710 is configured to receive, from the CPU, a command stream indicating one or more workgroups to be executed. As an example, based on a compute application running on the processing system, the command processor 802 receives a command stream indicating workgroups that require compute operations such as matrix multiplication, addition, subtraction, and the like to be performed. As another example, based on a graphics application running on the processing system, the command processor 802 receives a command stream indicating workgroups that include draw calls for a scene to be rendered. After receiving a command stream, the command processor 802 parses the command stream and issues respective instructions of the indicated workgroups to the front-end circuitry 804, the scheduling circuitry 806, or both. As an example, based on a command stream from a graphics application, the command processor 802 issues one or more draw calls to the front-end circuitry 804. In one or more implementations, the front-end circuitry 804 includes one or more vertex shaders, polygon list builders, and so on.

Based on the instructions issued from the command processor 802, for instance, the front-end circuitry 804 is configured to position geometry objects in a scene, assemble primitives in a scene, cull primitives, perform visibility passes for primitives in a scene, generate visible primitive lists for a scene, or any combination thereof. In one example, based on a set of draw calls received from a command processor 802, the front-end circuitry 804 determines a list of primitives to be rendered for a scene. After determining a list of primitives to be rendered for the scene, the front-end circuitry 804 issues one or more draw calls (e.g., a work-group) associated with the primitives in the list of primitives to the scheduling circuitry 806.

Based on the instructions of the workgroups received from a command processor 802, the front-end circuitry 804, or both, the scheduling circuitry 806 is configured to provide data indicating threads (e.g., operations for these threads) to be executed for these workgroups to one or more compute units 808.

In at least one implementation, each compute unit 808 is configured to support the concurrent execution of two or more threads of a workgroup. For example, each compute unit 808 is configured to concurrently execute a predetermined number of threads referred to herein as a "wavefront." Based on the size of the wavefront of a compute unit 808, the scheduling circuitry 806 is configured to schedule one or more groups of threads of the workgroup, also referred to herein as "waves," for execution by the compute unit 808.

As an example, the scheduling circuitry 806 first updates one or more registers of a compute unit 808 such that the compute unit 808 is configured to execute a first group of waves of the workgroup. After the compute unit 808 has executed the first group of waves, the scheduling circuitry 806 updates one or more registers of the compute unit 808 to schedule a second group of waves of the workgroup to be executed by the compute unit 808. To execute these waves, each compute unit is connected to one or more shared cache(s) 810. In one or more implementations, each of the shared cache(s) 810 includes a volatile memory, non-volatile memory, or both accessible by one or more of the compute units 808. These shared cache(s) 810, for example, are configured to store data (e.g., register files, values, operands, instructions, variables) used in the execution of one or more waves, data resulting from the performance of one or more waves, or both. Because a shared cache 810 is accessible by two or more compute units 808, a first compute unit 808 is capable of providing results from the execution of a first wave to a second compute unit 808 executing a second wave. Though the example presented in FIG. 8 shows AU 710 as including 32 compute units (808-1 to 808-32), in other implementations, the AU 710 can include any number of compute units 808, i.e., one or multiple compute units 808.

In the illustrated example, each compute unit 808 includes one or more single instruction, multiple data (SIMD) units 814, a scalar unit 816, one or more vector registers 818, one or more scalar registers 820, local data share 822, instruction cache 824, data cache 826, texture filter units 828, texture mapping units 830, or any combination thereof. In implementations, the compute unit 808 may be configured with different components than in the illustrated example. Additionally, in at least one variation, the AU 710 includes at least two different types of compute unit 808, such as a bank of a first compute unit type and a bank of a second compute unit type.

In one or more implementations, a SIMD unit 814 (e.g., a vector processor) is configured to concurrently perform multiple instances of the same operation for a wave. For example, a SIMD unit 814 includes two or more lanes each including an arithmetic logic unit (ALU) and each configured to perform the same operation(s) for the threads of a wave. Though the example embodiment presented in FIG. 8 shows a compute unit 808 including three SIMD units (814-1, 814-2, 814-N) representing an N number of SIMD units, in other implementations, a compute unit 808 can include any number of SIMD units 814, e.g., one or more SIMD units 814. Further, as an example, the size of a wavefront supported by the AU 710 is based on the number of SIMD units 814 included in each compute unit 808.

To determine the operations performed by the SIMD units 814, each compute unit 808 includes vector registers 818. In one or more implementations, the vector registers 818 are formed from one or more physical registers of the AU 710. These vector registers 818 are configured to store data (e.g., operands, values) used by the respective lanes of the SIMD units 814 to perform a corresponding operation for the wave. Additionally, each compute unit 808 includes a scalar unit 816 configured to perform scalar operations for the wave. As an example, the scalar unit 816 includes an ALU configured to perform scalar operations. To support the scalar unit 816, each compute unit 808 also includes scalar registers 820. In one or more implementations, the scalar registers are formed from one or more physical registers of the AU 710. These scalar registers 820 store data (e.g., operands, values) used by the scalar unit 816 to perform a corresponding scalar operation for the wave.

Further, each compute unit 808 includes a local data share 822. In one or more implementations, the local data share 822 is formed from a volatile memory (e.g., random-access memory) accessible by each SIMD unit 814 and the scalar unit 816 of the compute unit 808. That is to say, the local data share 822 is shared across each wave concurrently executing on the compute unit 808. The local data share 822 is configured to store data resulting from the execution of one or more operations for one or more waves, data (e.g., register files, values, operands, instructions, variables) used in the execution of one or operations for one or more waves, or both. As an example, the local data share 822 is used as a scratch memory to store results necessary for, aiding in, or helpful for the performance of one or more operations by one or more SIMD units 814.

The instruction cache 824 of a compute unit 808, for example, includes a volatile memory, non-volatile memory, or both configured to store the instructions to be executed for one or more waves executed by the compute unit 808. Further, the data cache 826 of a compute unit 808 includes a volatile memory, non-volatile memory, or both configured to store data (e.g., register files, values, operands, variables) used in the execution of one or more waves by the compute unit 808.

In at least one implementation, the instruction cache 824, the data cache 826, the shared cache(s) 810, and a system memory, for example, are arranged in a hierarchy based on the respective sizes of the caches. As an example, based on such a cache hierarchy, a compute unit 808 first requests data from a controller of a corresponding data cache 826. Based on the data not being in the data cache 826, the data cache 826 requests the data from a shared cache 810 at the next level of the cache hierarchy. The caches then continue in this way until the data is found in a cache or requested from the system memory, at which point, the data is returned to the compute unit 808.

Additionally, each compute unit 808 includes one or more texture mapping units 830 each including circuitry configured to map textures to one or more graphics objects (e.g., groups of primitives) generated by the compute units 808. Further, each compute unit 808 includes one or more texture filter units 828 each having circuitry configured to filter the textures applied to the generated graphics objects. For example, the texture filter units 828 are configured to perform one or more magnification operations, anti-aliasing operations, or both to filter a texture.

Additionally, to help perform instructions for one or more workgroups, AU 710 includes acceleration circuitry 812. Such acceleration circuitry 812 includes hardware (e.g., fixed-function hardware) configured to execute one or more instructions for one or more workgroups. As an example, the acceleration circuitry 812 includes one or more instances of fixed function hardware configured to encode frames, encode audio, decode frames, decode audio, display frames, output audio, perform matrix multiplication, or any combination thereof. To schedule instructions for execution on such hardware, the scheduling circuitry 806 is configured to update one or more physical registers 836 of the AU 710 associated with the hardware.

In some cases, the AU 710 includes one or more compute units 808 grouped into one or more shader engines 834 or engines for other types of computations, such as training and/or inference utilized to implement artificial intelligence. Referring to the embodiment depicted in FIG. 8, for example, the AU 710 includes compute units 808-1 to 808-16 grouped in a first shader engine 834-1 (or other type of engine) and compute units 808-17 to 808-32 grouped in a second shader engine 834-2 (or other type of engine). Such shader engines 834, for example, are configured to execute one or more workgroups (e.g., one or more compute kernels) for an application and include one or more compute units 808, graphics processing hardware (e.g., primitive assemblers, rasterizers), one or more shared cache(s) 810, render backends, or any combination thereof. Though the embodiment presented in FIG. 8 shows AU 710 as including two shader engines (834-1, 834-2), in other implementations, the AU 710 can include any number of shader engines (834-1, 834-2) or groupings for other types of operations.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the control unit 104, the registers 106, the processing pipeline 108, the computational units 110, the HKPM unit 112, the power telemetry source 118, the HKPM units 306, the HKPM unit 406, and the cluster control unit 408) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device that manages power consumption of the processing device by injecting stateless instructions into a processing pipeline and refraining from writing-back results obtained from executing the stateless instructions.

2. The processing device of claim 1, wherein the stateless instructions are injected into the processing pipeline to throttle execution of program instructions injected into the processing pipeline and control the power consumption.

3. The processing device of claim 1, wherein the processing pipeline includes a plurality of pipelines, and the stateless instructions are injected into a first processing pipeline to manage the power consumption during execution of program instructions processed through a second processing pipeline.

4. The processing device of claim 3, wherein the execution of the program instructions is stalled in the second processing pipeline and the stateless instructions are processed through the first processing pipeline to balance the power consumption while the execution of the program instructions is stalled.

5. The processing device of claim 3, wherein the stateless instructions are generated based on power telemetry information measured during the execution of the program instructions.

6. The processing device of claim 1, wherein the stateless instructions are floating point instructions, and the processing pipeline is a floating point pipeline.

7. The processing device of claim 1, wherein the stateless instructions include one or more groups of individual stateless instructions injected in the processing pipeline to cause a specific amount of increase or decrease in the power consumption.

8. The processing device of claim 1, wherein the processing device is a single processing node in a plurality of nodes of a processing cluster.

9. The processing device of claim 1, wherein the processing device includes a hardware kernel unit configured to inject the stateless instructions into the processing pipeline to manage the power consumption.

10. A system comprising:

a hardware kernel unit configured to generate stateless instructions; and a processing device configured to manage power consumption of the system by executing the stateless instructions generated by the hardware kernel unit and refraining from writing-back results obtained from executing the stateless instructions.

11. The system of claim 10, wherein the hardware kernel unit is configured to generate the stateless instructions based on power telemetry information measured at the processing device during execution of program instructions.

12. The system of claim 11, wherein the hardware kernel unit is configured to obtain the power telemetry information from a power profile during the execution of the program instructions and generate the stateless instructions to maintain the power consumption within a power band defined by the power profile.

13. The system of claim 10, wherein the processing device includes a plurality of processing pipelines and execute the stateless instructions using a first pipeline while executing program instructions using a second pipeline.

14. The system of claim 10, wherein the processing device is configured to load the stateless instructions within an unused processing pipeline to manage the power consumption during execution of program instructions being processed through another processing pipeline.

15. The system of claim 10, wherein the processing device is configured to refrain from writing-back the results obtained from executing the stateless instructions by discarding the results obtained from executing the stateless instructions and refraining from writing the results to registers of the processing device.

16. The system of claim 10, wherein the hardware kernel unit is configured to cease generating the stateless instructions when processing pipelines available for executing program instructions are unused for a threshold duration of time.

17. A method comprising:

receiving, by a processing device, stateless instructions generated by a hardware kernel unit; and managing, by the processing device, power consumption by executing the stateless instructions and refraining from writing-back results obtained from executing the stateless instructions.

18. The method of claim 17, wherein the processing device is a single processing node in a processing cluster that includes a plurality of processing nodes, and the hardware kernel unit is a single hardware kernel unit associated with the processing cluster.

19. The method of claim 17, wherein the processing device is a single processing node in a processing cluster that includes a plurality of processing nodes, and the hardware kernel unit is a single hardware kernel unit corresponding to the single processing node.

20. The method of claim 17, wherein the stateless instructions are floating point instructions, and executing the stateless instructions includes using a floating point pipeline of the processing device.

* * * * *